(12) United States Patent
Allard et al.

(10) Patent No.: US 8,966,743 B2
(45) Date of Patent: Mar. 3, 2015

(54) ELECTRODE-CHANGING DEVICE HAVING IMPROVED SAFETY

(75) Inventors: Jean-Luc Allard, Mejannes le Clap (FR); Jean-Pierre Schwanck, Saint Paul Trois Chateaux (FR)

(73) Assignee: Areva NC, Paris (FR)

(*) Notice: Subject to any disclaimer, the term of this patent is extended or adjusted under 35 U.S.C. 154(b) by 173 days.

(21) Appl. No.: 13/502,960

(22) PCT Filed: Oct. 18, 2010

(86) PCT No.: PCT/EP2010/065599
§ 371 (c)(1),
(2), (4) Date: Apr. 19, 2012

(87) PCT Pub. No.: WO2011/048037
PCT Pub. Date: Apr. 28, 2011

(65) Prior Publication Data
US 2012/0240395 A1    Sep. 27, 2012

(30) Foreign Application Priority Data
Oct. 20, 2009    (FR) ...................................... 09 57348

(51) Int. Cl.
| | |
|---|---|
| *B23P 19/00* | (2006.01) |
| *H05K 13/04* | (2006.01) |
| *B23K 9/32* | (2006.01) |
| *B23K 9/12* | (2006.01) |

(52) U.S. Cl.
CPC .... *B23K 9/32* (2013.01); *B23K 9/12* (2013.01)
USPC ................... 29/729; 29/721; 29/749; 29/759; 29/760; 29/787

(58) Field of Classification Search
USPC ................... 29/721, 729, 749, 759, 760, 787
See application file for complete search history.

(56) References Cited

U.S. PATENT DOCUMENTS

| | | | | |
|---|---|---|---|---|
| 4,764,653 | A | * | 8/1988 | Buhler ........................ 219/69.15 |
| 4,853,512 | A | * | 8/1989 | Scheider .................... 219/69.15 |
| 7,901,613 | B2 | * | 3/2011 | Kollatschny et al. .......... 264/511 |
| 8,250,754 | B2 | * | 8/2012 | Seifert ............................ 29/883 |
| 8,442,650 | B2 | * | 5/2013 | Seifert ........................... 607/116 |
| 8,509,914 | B2 | * | 8/2013 | Kollatschny et al. ......... 607/116 |
| 2012/0279062 | A1 | | 11/2012 | Allard et al. |

FOREIGN PATENT DOCUMENTS

JP    2001-108786 A    4/2001

OTHER PUBLICATIONS

U.S. Appl. No. 13/515,257, filed Jul. 19, 2012.

* cited by examiner

*Primary Examiner* — Paul D Kim
(74) *Attorney, Agent, or Firm* — Miles & Stockbridge P.C.

(57) ABSTRACT

A device for changing the electrode of an electrode-holder tool of a welding device, with a first part configured to house an electrode-holder tool and including means to prevent the electrode-holder tool from moving, and a second part installed around the first part and covering the part of the electrode protruding outside the first part, where the second part can be separated from the first part by sliding along the electrode, and is able to rotate relative to the fixed part when it surrounds it, and where the second part is configured to tighten or untighten the mandrel and to attach the electrode and the second part, enabling it to be removed from the mandrel when the first part and the second part are separated.

12 Claims, 7 Drawing Sheets

ELECTRODE-CHANGING DEVICE HAVING IMPROVED SAFETY

TECHNICAL FIELD AND PRIOR ART

The present invention relates to an electrode-changing device, and more specifically to a device for installing an electrode in and removing an electrode from a device intended for the manufacture of nuclear fuel rods.

Fuel rods comprise a sheath containing nuclear fuel pellets and a end cap to close the sheath.

The end cap is then welded along its entire periphery by a first welding device.

The end cap comprises a bore through which the rod is filled with a gas. This bore is then blocked by another welding device, called a seal welding device.

Each of these welding devices comprises an electrode to execute the welding.

This electrode is subject to wear and tear and must be replaced.

The replacement is undertaken manually by an operator.

The electrode is placed in an electrode-holder by one end, and the other end is used for the welding.

To replace the electrode, the operator grips with their fingers the free end of the electrode and pulls it to remove it from the electrode-holder.

To install a new electrode they grasp the electrode by its welding end and place the other end in the electrode-holder.

In addition, these devices are installed in gloveboxes, isolating the rods from the operator.

The operator can use the welding devices only through gloves attached to a wall of the glovebox.

These interventions are therefore laborious.

In addition, confinement integrity must be guaranteed, and by this means any tearing of the gloves must be prevented.

However, the end of the electrodes intended for the welding is extremely sharp. It therefore happens that operators tear their gloves when changing electrodes.

And we recall that the interior of the gloveboxes can be contaminating, and such tearing could therefore contaminate the operator and the outside environment.

One aim of the present invention is consequently to provide an electrode-changing device of greater safety for the operator, and which more specifically protects against risks of tearing by the electrode.

PRESENTATION OF THE INVENTION

The aim set out above is attained by an electrode-changing device comprising a fixed part to support the electrode-holder of the welding device, and a moving part covering the end of the electrode-holder holding the electrode, where the moving part is able to grasp the electrode by its sharpened end and remove it from the electrode-holder, and to put another electrode in its place, whilst protecting the operator from any tearing due to the electrode.

In other words, a gripping tool for the electrodes is provided, where this tool covers the sharpened end of the worn electrode, and that of the new electrode, in order to isolate the operator from these ends.

The subject-matter of the present invention is therefore mainly a device for removing an electrode from a mandrel of an electrode-holder tool and/or for installing an electrode in a mandrel of an electrode-holder tool, where said electrode-holder tool forms part of a welding device, where said electrode-holder tool is removed from the welding device before the electrode is removed or installed, where said device for removing/installing an electrode comprises a first part intended to house said electrode-holder tool, where said electrode protrudes at least partly outside said first part, where said first part comprises means to stop the electrode-holder tool in translation and in rotation, and a second part installed around the first part intended to cover the part of the electrode protruding outside the first part, where the second part can be separated from the first part by sliding it along the electrode and is able to rotate relative to the first part when it surrounds it, where the second part comprises means to tighten or untighten the mandrel of the electrode-holder tool and means to attach the electrode to the moving part to allow it to be removed from the mandrel when the first and second parts are separated, or means to insert the electrode when the first and second parts are installed.

The means to stop the translation and the rotation of the electrode-holder tool are, for example, formed by an internal thread co-operating with threading on the electrode-holder tool.

The first part can comprise a tubular body forming a tool post, and the second part can comprise a tubular cover surrounding the tool post, and able to pivot around it, and in which the means to tighten or untighten the mandrel comprise a cavity shaped like the mandrel tightening and untightening element.

For example, the means to attach the electrode to the part protruding from the electrode are means forming a clamp of one end of the electrode. The means forming a clamp can comprise two fingers forming a lever rotating around their median part in two diametrically opposite slots of the tubular body of the second part, where the fingers comprise free ends intended to clamp the electrode, and where said fingers comprise an actuating portion protruding from the tubular body of the second part.

The moving part advantageously comprises means to adjust the length of penetration of the electrode in the second part.

For example, the second part comprises an open lengthways end for introducing the tool post, and a second closed lengthways end, where the adjustment means comprise a screw installed in the second closed lengthways end, emerging inside the second part, where said screw is aligned with the axis of the electrode, where the end of the screw located in the second part is intended to come into contact with the free end of the electrode forming a stop for it.

Also advantageously, the second part comprises means to guide the introduction of the electrode into the second part.

The first part may comprise a rod fitted with a stand supporting the tool post, where said stand is intended to be attached to a work surface.

The electrode-changing device according to the invention can be installed in a glovebox.

The electrode-changing device according to the invention is advantageously used for devices for welding end caps to the sheath of nuclear fuel rods and/or for devices for seal welding nuclear fuel rod end caps.

Another subject-matter of the present invention is a method to remove an electrode from an electrode-holder tool using the device according to the present invention, comprising, after a step of removing the electrode-holder tool from the welding device, the following steps:

a) introduction of the electrode-holder tool in the tool post, where the second part is installed on the tool post, where the free end of the electrode passes through the tool post and emerges in the second part, b) stop of the translation and the rotation of the electrode-holder tool in the tool post, c) untightening of the mandrel using the second part, d) attaching the electrode to the second part, e) separation of the tool post and the second part by translation, where the electrode leaves with the second part.

Step b) may be obtained by screwing the electrode-holder tool in the tool post. Step c) may be obtained by rotating the second part relative to the tool post. Step d) may be obtained by clamping the electrode by the causing the fingers to converge.

The removal method according to the invention may comprise the step of removing the electrode from the second part, by releasing the clamping, in which case the electrode falls under gravity.

Another subject-matter of the present invention is a method to install an electrode in an electrode-holder tool using the device according to the present invention, comprising, after a step of removing the electrode-holder tool from the welding device, the following steps:

a') introduction of the electrode-holder tool in the tool post, where the mandrel passes through the tool post, b') stop of the translation and the rotation of the electrode-holder tool in the tool post, c') installation of an electrode in the second part and immobilisation of it in the second part by the electrode's welding end, d') assembly of the tool post and of the second part by translating and by bringing them together, where the electrode's remaining free end penetrates in the mandrel, e') separation of the electrode and of the second part, f') tightening of the mandrel.

Step b') may be obtained by screwing the electrode-holder tool in the tool post.

Step c') may be obtained by clamping the electrode by the causing the fingers to converge.

Step e') may be obtained by releasing the clamping of the electrode by the fingers.

Step f') may be obtained by rotating the second part relative to the tool post.

BRIEF DESCRIPTION OF THE ILLUSTRATIONS

The present invention will be better understood using the description which follows and the appended illustrations, in which.

DETAILED ACCOUNT OF PARTICULAR EMBODIMENTS

Figure 1:
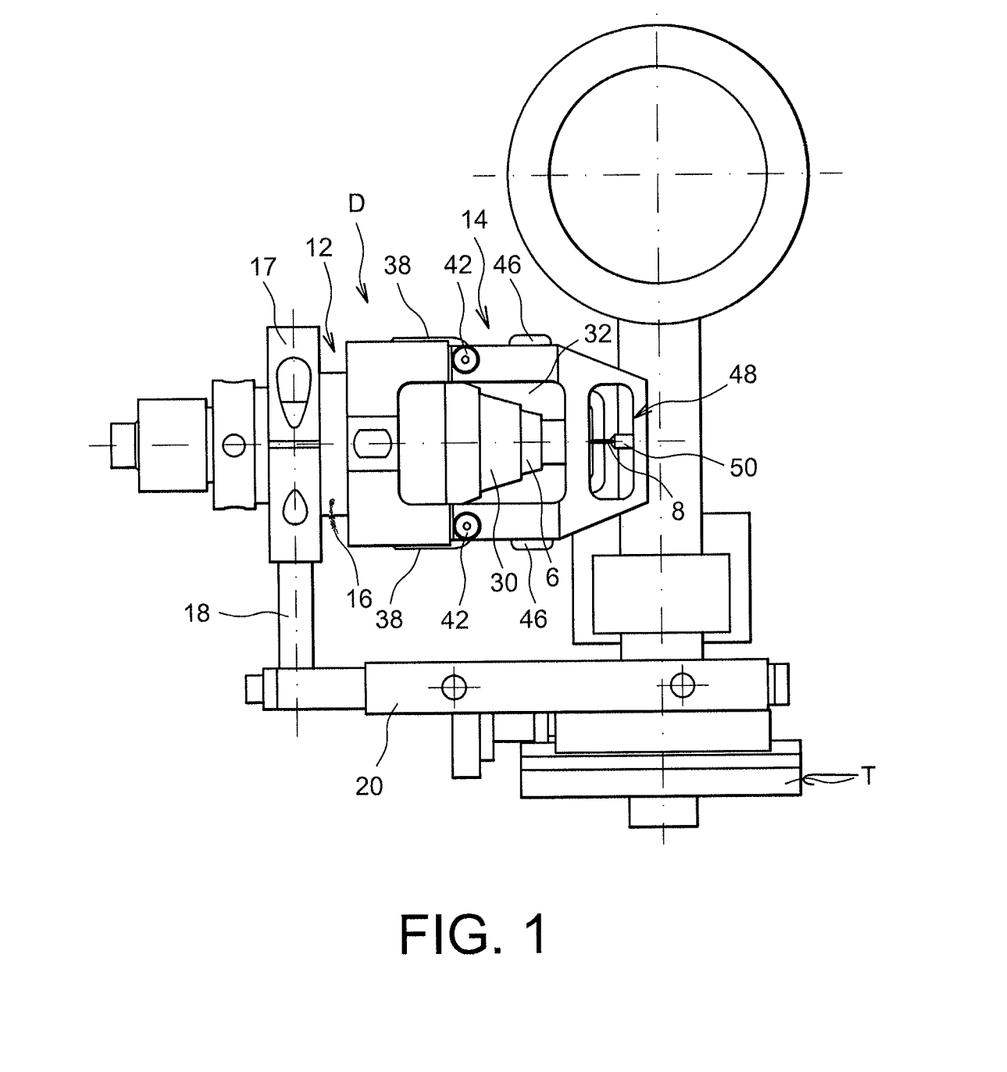
FIG. 1 is a side view of an example embodiment of the electrode-changing device according to the present invention, in which the electrode-holder is installed.
Figure 2:
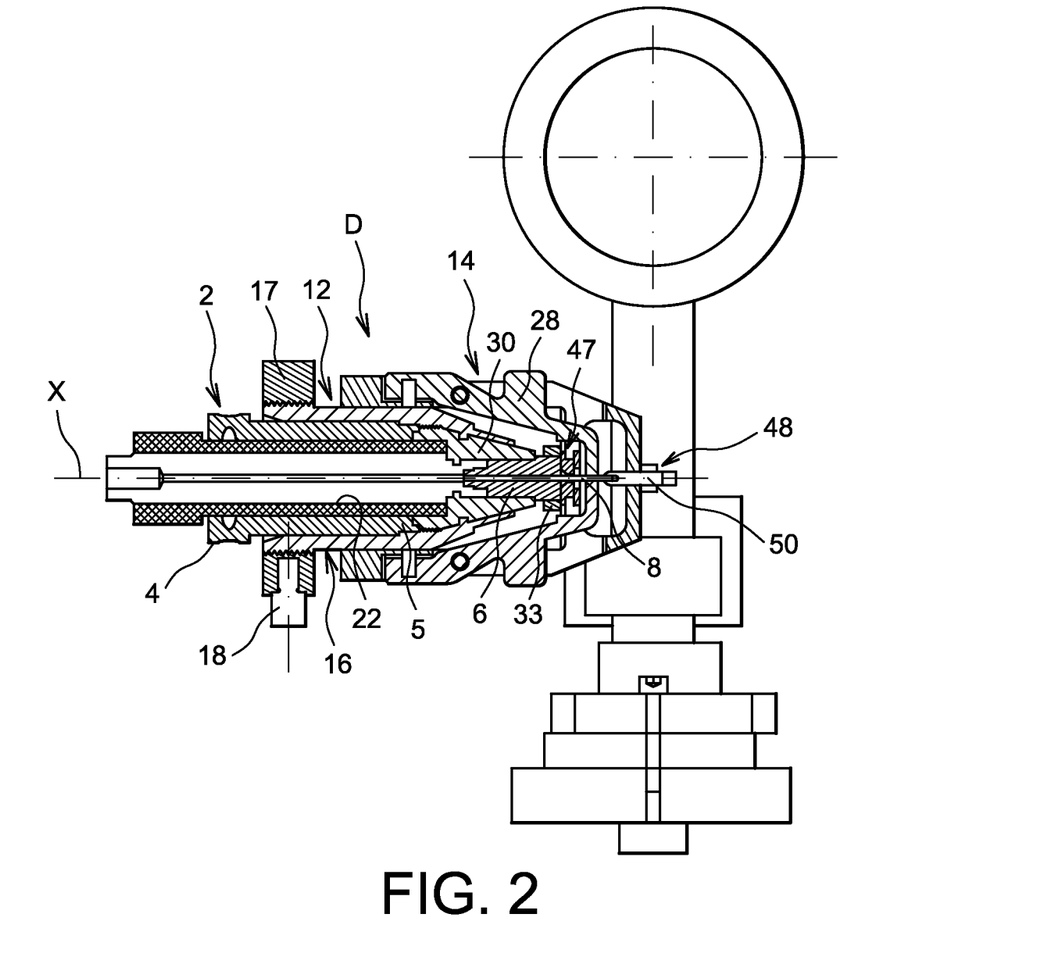
FIG. 2 is a lengthways section view of the device of FIG. 1.
Figure 3:
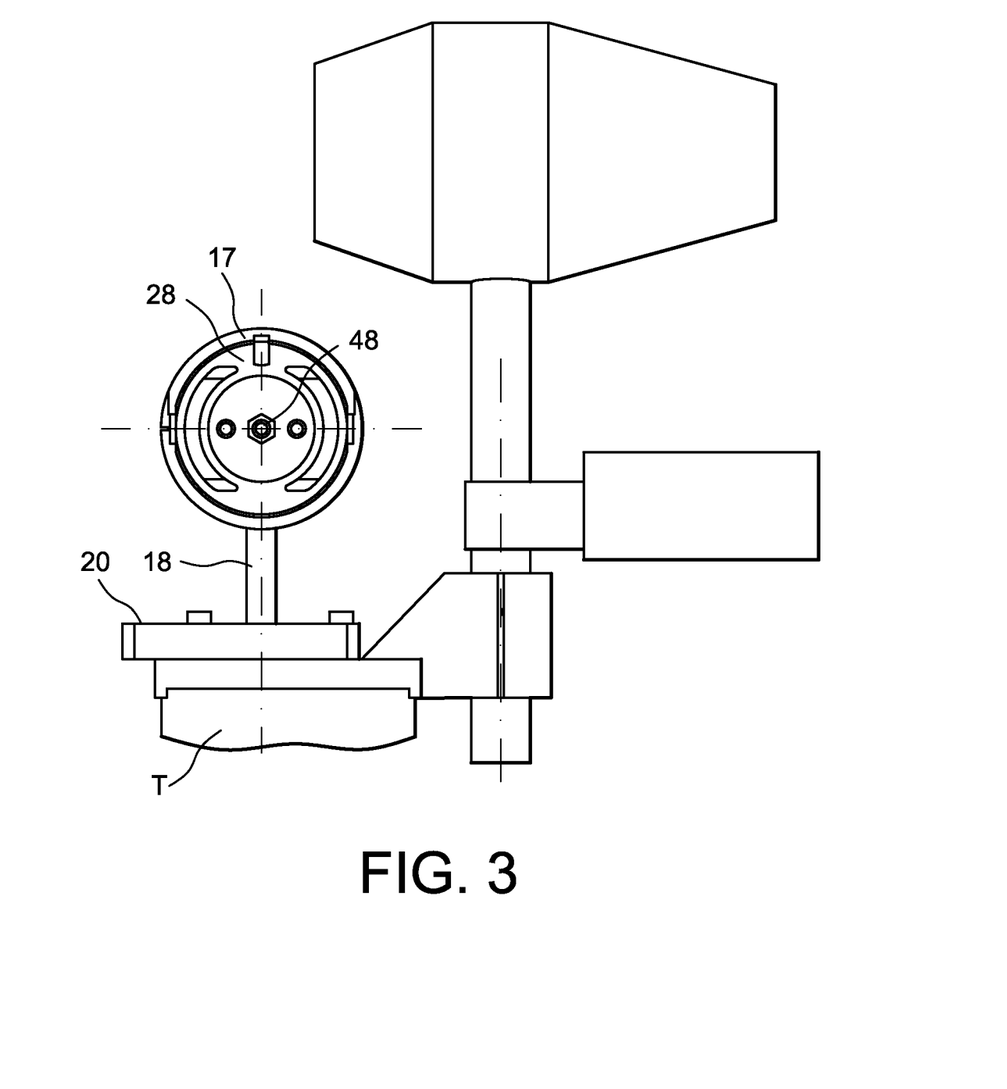
FIG. 3 is a front view of the device of FIG. 1.

In FIG. 2 a section view can be seen of an electrode-holder tool 2 of axis X intended to support a welding electrode, where this tool is itself installed in a welding device (not represented).

Electrode-holder tool 2 is represented installed in the device according to the invention.

Electrode-holder tool 2 comprises a body 4 and a mandrel 6 installed in body 4, where mandrel 6 is intended to hold electrode 8 by tightening.

Body 4 comprises, on its outside periphery, a threaded area 5 enabling it to be installed in the welding device.

Mandrel 6, which is installed in a bore of body 4, comprises at its free end 6.1 an element to allow untightening and tightening of electrode 8, where this element can be, for example, of hexagonal or square section. Electrode 8 is coaxial with axis X.

In FIGS. 1 to 4 an example embodiment of an electrode-changing device D according to the present invention can be seen.

The electrode-changing device comprises a fixed part 12 intended to be attached to a work surface T, for example on a table where the welding device is positioned, and a moving part 14 intended to manipulate the electrodes.

Fixed part 12 comprises a tool post 16 intended to house electrode-holder tool 2.

Tool post 16 is, in the represented example, installed in a ring 17 supported by a rod 18 fitted with a stand 20 attached to the work surface.

Stand 20, in the represented example, is screwed on to the work surface.

Figure 4:
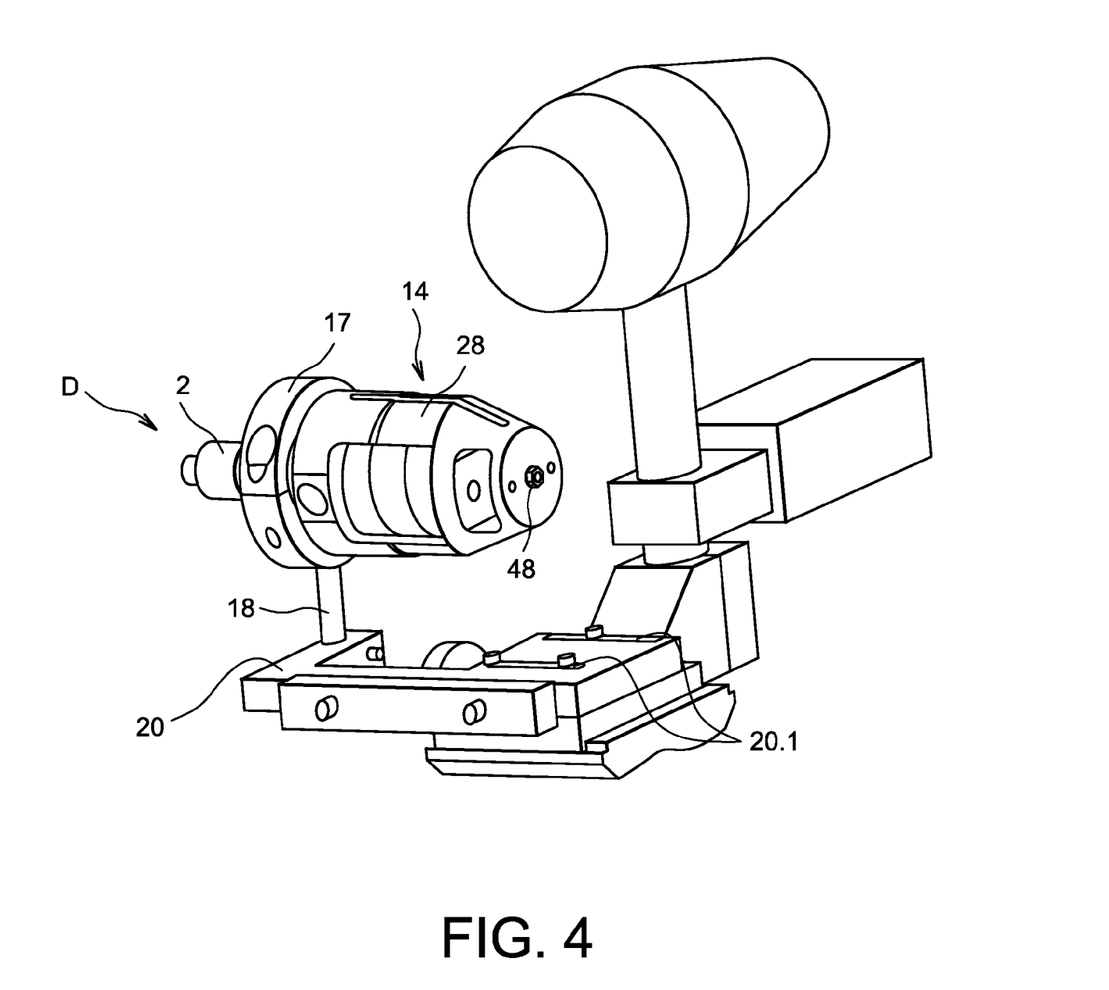
FIG. 4 is a perspective view of the device of FIG. 1, FIGS. 5A to 5F are detailed views of the moving part of the device of FIG. 1.

Advantageously, it comprises two parallel grooves 20.1 for the passage of the screws, and to allow an adjustment of the positioning of the stand relative to the work surface, as can be seen in FIG. 4.

Tool post 16 comprises a tubular body 22 having a shaft housing X1 having a shape identical to that of electrode-holder tool 2. Housing 22 is open at both ends. When electrode-holder tool 2 is installed in tool post 16 axes X and X1 are identical.

In the represented example, the electrode-holder tool comprises a cylindrical portion with a circular section and a tapered portion.

Housing 22 also comprises a portion with a corresponding circular section 22.1 and a portion with a corresponding tapered section 22.2.

In the example represented, the body comprises a portion of greater external diameter 24 installed in ring 17. The body is, for example, held in ring 17 by tightening, where ring 17 is formed from two circle arcs connected to one another at both ends by screws screwed directly into one of the circle arcs.

The internal surface of body 22 comprises a portion 26 with an internal thread intended to cooperate with threaded part 5 of the body of electrode-holder tool 4.

The length of the housing of tool post 16 is such that when electrode-holder tool 2 is positioned in the housing the tool extends beyond it at both ends.

Figure 5A:
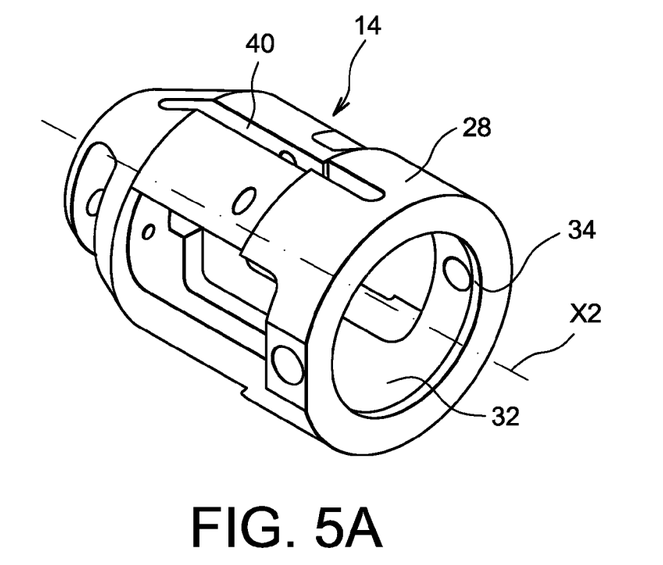
Figure 5B:
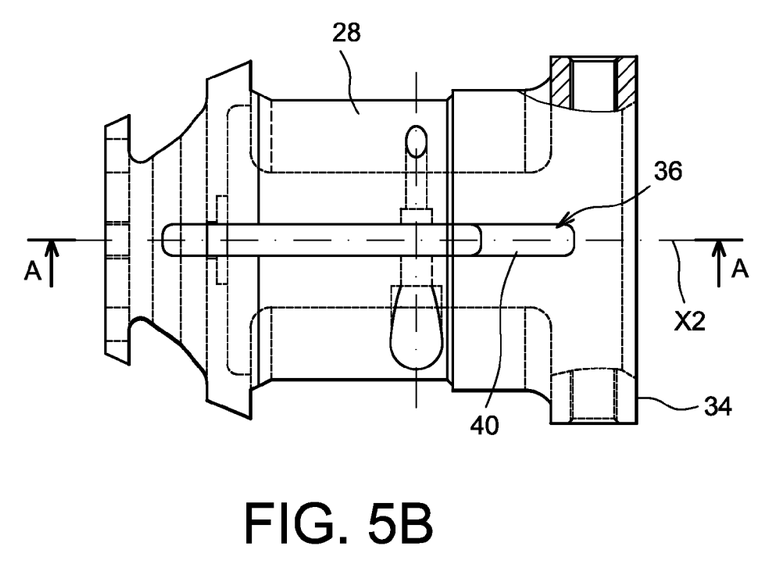
Figure 5C:
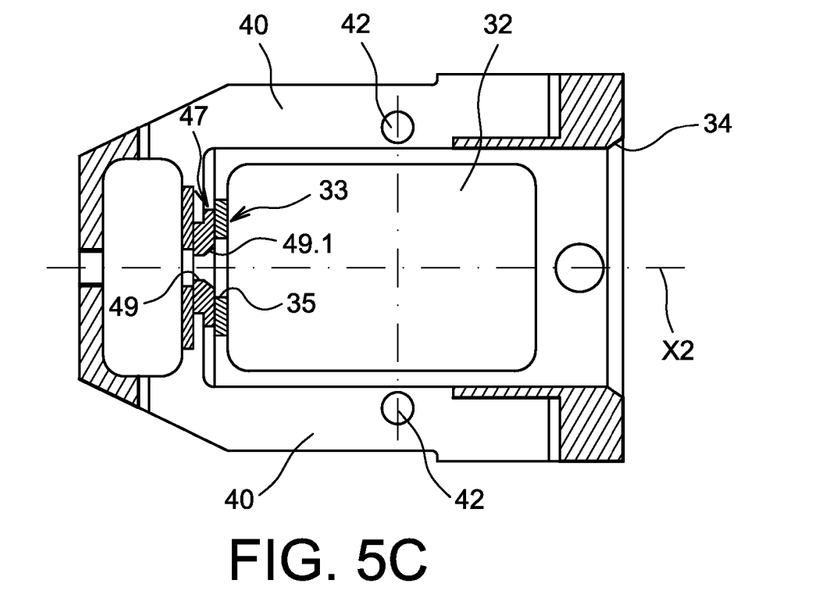

Moving part 14 comprises a body 28 forming a cover intended to cover end 30 of tool post 16 from which the electrode emerges, as can be seen in figures and 2. Moving part 14 is visible in isolation in FIGS. 5A to 5C.

Cover 28 therefore defines a housing 32 having an axis X2 intended to receive end 30 of tool post 16, the mandrel and the free end of electrode 8. When cover 28 is installed on tool post 16 axes X, X1 and X2 are coaxial.

Housing 32 comprises a lengthways opening 34, through which tool post 16 penetrates into housing 32, where this opening 34 has a diameter roughly equal to the external diameter of the circular portion of the body of the tool post. Thus, when cover 28 is positioned on support 16, cover 28 is installed on support 16 with a minimal amount of play.

Moving part 14 also comprises means 33 to untighten or tighten the mandrel. These means are formed, in the represented example, by a flange represented in isolation in FIG. 5E, and comprising a plate fitted with a cavity 35 with a profile matching that of element 10 of electrode-holder tool 2; the profile is hexagonal in the represented example. Flange 33 is positioned in the housing such that, when cover 28 is put in place on tool post 16, the mandrel fits into cavity 35. In the figure mandrel 6 can be seen in cavity 35.

Moving part 14 also comprises means 36 forming a clamp to grasp the electrode to be removed from electrode-holder tool 2 or to be put in position on electrode-holder tool 2.

In the represented example clamp 36 comprises two fingers 38 installed pivoting in cover 28.

Figure 5D:
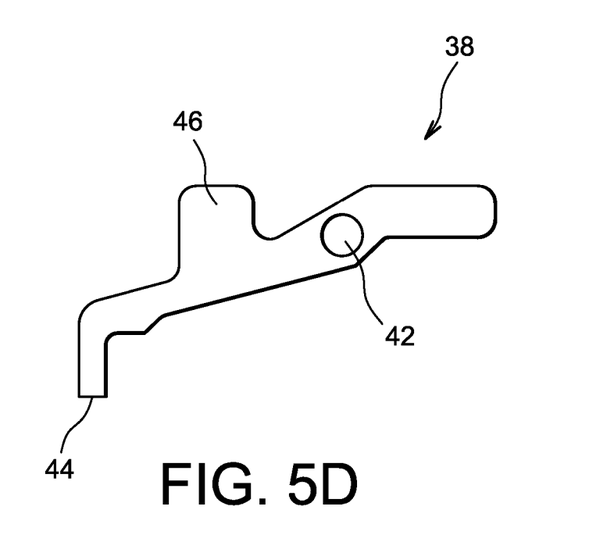
Figure 5E:
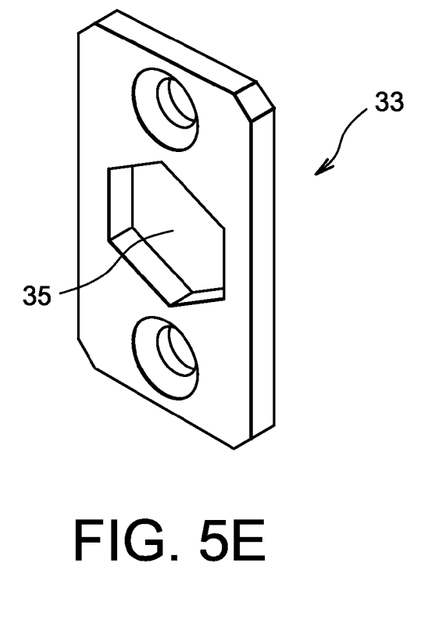

In FIG. 5D a finger 38 can be seen, represented in isolation.

Cover 28 comprises two lengthened, diametrically opposite slots 40, extending along lengthways axis X2.

In each slot 40 a finger 38 is installed pivoting on an axis 42. Axis 42 is orthogonal with axis X2. Axis 42 is located roughly in the centre of fingers 38.

Each finger 38 forms a lever pivoting on axis 42.

Finger 38 comprises an end 44 intended to come into contact with the electrode and to exert a tightening force on electrode 8 in cooperation with other the finger 38.

Finger 38 comprises, between axis 42 and end 44, an actuating portion 46 protruding laterally to cause finger 38 to pivot in a tightening direction of the electrode.

Actuating part 46 protrudes from the surface of cover 28 to allow access to it by the operator, who will apply a force on elements 46 of both fingers 38 simultaneously, in order to cause electrode 8 to be clamped.

Return springs are also installed in fingers 38, the function of which is to hold the fingers separate, i.e. to hold the clamp open when there is no action on the fingers, since the clamp is closed due to the pressure exerted by the operator.

Figure 5F:
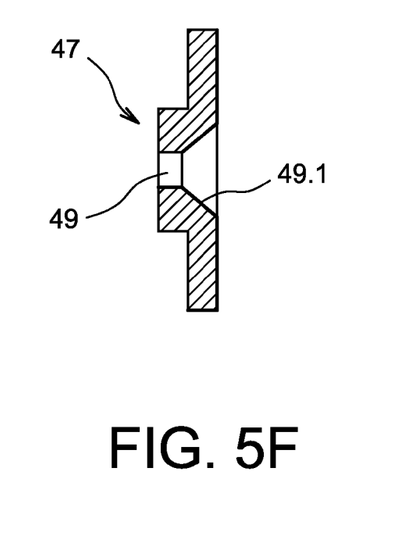
Figure 6:
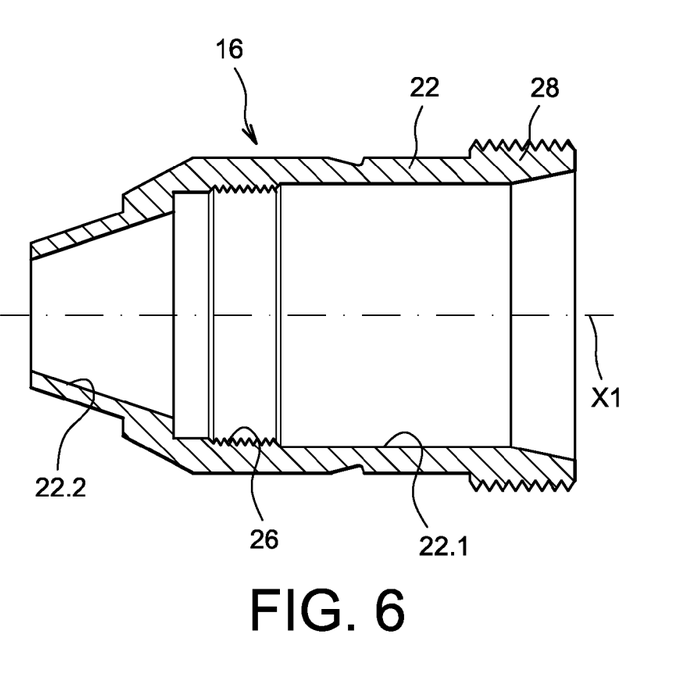
FIG. 6 is a lengthways section view of the fixed holder of the device of FIG. 1.

Moving part 14 also comprises, upstream from the electrode's tightening area, means 47 for guiding the free end of the electrode. These guiding means are formed by a plate represented as a lengthways section in FIG. 5F, fitted with a passage 49 intended to be traversed by electrode 8, the diameter of this passage being roughly equal to that of electrode 8. Advantageously, the entry of the passage is lined by a bevel 49.1 orientated in the direction of penetration of the electrode, improving guidance of the electrode.

Moving part 14 also comprises means 48 to adjust the lengthways position of electrode 8, notably in a step of installing a new electrode, to ensure that the length of electrode extending beyond electrode-holder tool 2 is constant.

Adjustment means 48 comprise an adjusting screw 50 screwed in a through bore drilled in the closed end of cover 28, the bore having axis X2. The depth to which electrode 8 penetrates into the cover is thus modified according to the depth to which adjusting screw 50 is screwed.

We shall now explain the use of the electrode-changing device according to the invention. When the operator removes a worn electrode they generally replace it immediately.

In a situation of non-use, moving part 14 of electrode-changing device D is installed on fixed part 12 of electrode-changing device D whilst awaiting use; more specifically cover 28 is installed on tool post 16.

When the operator wishes to replace an electrode 8 they remove electrode-holder tool 2 from the welding device, and install the latter in tool post 16. To do so, they push in the body of electrode-holder tool 2 and screw the latter into tool post 16. Electrode-holder tool 2 is then held fixedly in tool post 16.

When electrode-holder tool 2 is installed in tool post 16 electrode 8 penetrates into passage 35 of the cover's guide plate and the mandrel's hexagonal section element fits into mandrel flange 33.

The operator then pivots cover 28 relative to tool post 16 around axis X, causing nut 10 to rotate via the rotation of plate 33, and causing electrode 8 to become untightened.

The operator then presses simultaneously on both actuating elements 46, which causes the fingers to pivot around axes 42, and electrode 8 to be tightened.

The operator then moves moving part 14 in a lengthways direction in order to remove it from tool post 16 whilst maintaining their pressure on the fingers; electrode 8 is held fixedly in moving part 14, and is removed with it.

The operator then grasps electrode 8 by its tightening end, which presents no risk for the gloves, releases their pressure on fingers 38, removes electrode 8 from moving part 14, and discards it in a suitable container.

To replace an electrode 8 in electrode-holder tool 2 they carry out the reverse operations.

To do so, they take a new electrode by its tightening end; moreover only this end is accessible when the new electrodes are in their case.

The operator then pushes electrode 8 by its free end into moving part 14 until it comes to a stop against adjusting screw 50. They then know that electrode 8 is correctly in position.

He then applies a pressure to both actuating elements of fingers 38 to tighten new electrode 8.

He puts moving part 14 back in position on tool post 16 by guiding the welding end of electrode 8 in mandrel 6. He releases his pressure on fingers 38, and electrode 8 is no longer held by fingers 38.

The operator then pivots cover 28 in the tightening direction of mandrel 6, and electrode 8 is then tightened in mandrel 6.

He then unscrews electrode-holder tool 2, releasing it from tool post 16, and can put it back in position in the welding device.

The electrode-changing device according to the present invention provides a protective barrier between the sharp end of the electrode and the operator. The only moment when this end is visible is when the operator removes the electrode from the cover or puts an electrode in position in the cover.

And during these steps there is no reason for the operator to touch this end, and since they do no complex or laborious handling they can focus their attention on this end. Risks of injury are therefore reduced.

Moreover, adjusting the length of the electrode protruding from the electrode-holder is very simple. To do so, the adjusting screw need merely be screwed in or unscrewed in order to adjust the depth of penetration of the electrode in the cover. When an electrode is installed in the cover the operator introduces the electrode's welding end until it comes to a stop against the adjusting screw; they are then sure that the electrode's length will be correct.

The electrode-changing device according to the present invention is particularly suitable for use in confined spaces, and particularly in gloveboxes.

But it is clearly understood that the present invention applies to any welding device whatever, and not only to welding devices in confined environments.

The shape of the different parts of the tools is not restricted in any way, and can be modified, notably according to the shape of the electrode-holder tool concerned.

The invention claimed is:

1. A device for removing an electrode from a mandrel of an electrode-holder tool and/or for installing an electrode in the mandrel of an electrode-holder tool, said electrode-holder tool forming part of a welding device, said electrode-holder tool being removed from the welding device before the electrode is removed or installed, said device comprising:
a first part configured to house said electrode-holder tool, a part of said electrode protruding at least partly outside of said first part, said first part comprising a device constructed to stop the electrode-holder tool in translation and in rotation; and a second part installed around the first part and being configured to cover said part of the electrode protruding outside the first part, the second part being configured to be separated from the first part by sliding said second part along the electrode and also being configured to rotate relative to the first part when said second part surrounds said first part, the second part comprising a device to tighten or untighten the mandrel of the electrode-holder tool and a device to attach the electrode to the second part to allow it to be removed from the mandrel when the first and second parts are separated, or to permit insertion of the electrode when the first and second parts are installed, said second part being installed around the first part such that, when the electrode-holder tool is disposed within the first part, the electrode penetrates into the device for attaching the electrode of the second part and the mandrel penetrates into the device for tightening or untightening the mandrel.

2. The device according to claim 1, in which the device to stop the electrode-holder tool in translation and in rotation includes an internal thread cooperating with a thread on the electrode-holder tool.

3. The device according to claim 1, in which the first part comprises a tubular body forming a tool post and the second part comprises a tubular cover surrounding the tool post and configured to pivot around the tool post, and in which the device to tighten or untighten the mandrel comprises a cavity having a shape that matches a shape of the tightening or untightening element of the mandrel.

4. The device according to claim 1, in which the device to attach the electrode to the second part is a clamp of a welding end of the electrode.

5. The device according to claim 4, in which the device forming a clamp comprises two fingers forming a lever installed rotating in their median part in two diametrically opposite slots of the tubular body of the second part, the fingers comprising free ends configured to clamp the electrode, and said fingers comprising an actuating portion protruding from the tubular body of the second part.

6. The device according to claim 1, in which the second part comprises an adjuster to adjust a length of penetration of the electrode in the second part.

7. The device according to claim 6, in which the second part comprises an open lengthways end for introducing a tool post and a closed lengthways end, the adjuster comprising an adjusting screw installed in the closed lengthways end and emerging inside a tubular cover, said adjusting screw being aligned with an axis of the electrode, and an end of the screw located in the tubular cover being configured to come into contact with a free end of the electrode to form a stop for the electrode.

8. The device according to claim 1, in which the second part comprises a guide for guiding introduction of the electrode into the second part.

9. The device to claim 1, in which the first part comprises a rod fitted with a stand supporting a tool post, wherein said stand is configured to be attached to a work surface.

10. The device according to claim 1, in which said device further comprises a glovebox in which said device is installed.

11. The device according to claim 1, in which said device is adapted for welding an end cap on a sheath of a nuclear fuel rod.

12. The device according to claim 1, in which said device is adapted for seal welding an end cap of a nuclear fuel rod.

* * * * *